(12) United States Patent
Dsouza et al.

(10) Patent No.: US 11,934,776 B2
(45) Date of Patent: Mar. 19, 2024

(54) SYSTEM AND METHOD FOR MEASURING USER EXPERIENCE OF INFORMATION VISUALIZATIONS

(71) Applicant: Tata Consultancy Services Limited, Mumbai (IN)

(72) Inventors: Trevor Dsouza, Thane (IN); Hetal Dinesh Jani, Ahmedabad (IN)

(73) Assignee: TATA CONSULTANCY SERVICES LIMITED, Mumbai (IN)

(*) Notice: Subject to any disclaimer, the term of this patent is extended or adjusted under 35 U.S.C. 154(b) by 442 days.

(21) Appl. No.: 17/335,111

(22) Filed: Jun. 1, 2021

(65) Prior Publication Data

US 2022/0253598 A1 Aug. 11, 2022

(30) Foreign Application Priority Data

Feb. 8, 2021 (IN) .............................. 202121005325

(51) Int. Cl.
*G06F 40/20* (2020.01)
*G06Q 10/0639* (2023.01)

(52) U.S. Cl.
CPC ....... *G06F 40/20* (2020.01); *G06Q 10/06393* (2013.01)

(58) Field of Classification Search
CPC .............................................. G06Q 10/06393
See application file for complete search history.

(56) References Cited

U.S. PATENT DOCUMENTS

| 8,719,071 B2* | 5/2014 | MacIntyre | ........... | G06Q 10/063 705/7.29 |
| 10,347,017 B2* | 7/2019 | Ruble | ................... | G06T 11/206 |

(Continued)

OTHER PUBLICATIONS

Leilani Battle et al., "Position Statement: The Case for a Visualization Performance Benchmark", Workshop on Data Systems for Interactive Analysis (DSIA), Oct. 2017, IEEE, https://www.cs.umd.edu/~leilani/static/papers/dsia2017cameraready_08_23_2017_11_28.pdf.

(Continued)

*Primary Examiner* — Anne L Thomas-Homescu
(74) *Attorney, Agent, or Firm* — Finnegan, Henderson, Farabow, Garrett & Dunner LLP (57) ABSTRACT

The quality of user experience (UX) of an information visualization depends on multiple diverse aspects. These include qualitative, quantitative, and contextual parameters that are unmeasurable and incomparable. Hence, measuring the UX of a visualization is challenging. The disclosure herein relates to a system and method that collects, processes, and analyzes a multiple diverse parameters to measure and profile the UX of a visualization. To accomplish this, the system collects data regarding the usage, effectiveness, and user perception of the visualization. The system creates a quantitative and comparable version of all these parameters to measure holistically the UX of the visualization. This involves quantifying qualitative values, considering context by objectively computing the complexity of charts, complexity based benchmarking, summarizing individual parameters into hedonic and pragmatic scores, plotting the visualization on a scatter chart, dividing the scatter chart based on low-high hedonic and pragmatic scores, labeling each section and labeling the visualization.

7 Claims, 6 Drawing Sheets

(56) References Cited

U.S. PATENT DOCUMENTS

| | | | |
|---|---|---|---|
| 10,394,837 B2* | 8/2019 | Olof-Ors | G06F 16/24578 |
| 10,438,167 B2* | 10/2019 | Summerfield | G06Q 10/10 |
| 10,725,157 B1* | 7/2020 | Yates | G01S 7/4816 |
| 11,062,094 B2* | 7/2021 | Kieser | G06F 17/18 |
| 11,138,271 B1* | 10/2021 | Morningstar | G06F 16/26 |
| 11,763,546 B1* | 9/2023 | Saraee | G06V 10/82 |
| | | | 382/157 |
| 2003/0093352 A1* | 5/2003 | Muralidhar | G06Q 40/06 |
| | | | 705/36 R |
| 2008/0152122 A1* | 6/2008 | Idan | H04M 3/5175 |
| | | | 379/265.07 |
| 2008/0235075 A1* | 9/2008 | Couture | G06F 11/3438 |
| | | | 709/224 |
| 2009/0119301 A1* | 5/2009 | Cherkasova | G06Q 10/06 |
| 2010/0082751 A1* | 4/2010 | Meijer | G06F 15/16 |
| | | | 709/206 |
| 2012/0158527 A1* | 6/2012 | Cannelongo | H04N 21/2668 |
| | | | 707/748 |
| 2014/0068348 A1* | 3/2014 | Mondal | G06F 11/079 |
| | | | 714/45 |
| 2015/0278214 A1* | 10/2015 | Anand | G06F 16/338 |
| | | | 707/748 |
| 2016/0306846 A1* | 10/2016 | Adams, Jr. | G06F 16/2423 |
| 2017/0235662 A1* | 8/2017 | Leask | G06F 11/302 |
| | | | 717/125 |
| 2017/0287316 A1* | 10/2017 | Wildman | G08B 25/10 |
| 2018/0165723 A1* | 6/2018 | Wright | G06F 40/30 |
| 2018/0315499 A1* | 11/2018 | Appelbaum | H04L 67/12 |
| 2018/0366019 A1* | 12/2018 | Zertuche | G06Q 50/20 |
| 2019/0073365 A1* | 3/2019 | Jamshidi | G06F 16/9535 |
| 2019/0312800 A1* | 10/2019 | Schibler | H04L 63/1433 |
| 2019/0354913 A1* | 11/2019 | Venkadesavaralu | |
| | | | H04L 63/1433 |
| 2020/0104775 A1* | 4/2020 | Chintalapati | G06Q 10/06393 |
| 2020/0242532 A1* | 7/2020 | Kawamoto | G06Q 10/06393 |
| 2021/0082544 A1* | 3/2021 | Rudolph | G16H 50/30 |
| 2021/0225468 A1* | 7/2021 | Saliman | G16H 50/30 |
| 2021/0329812 A1* | 10/2021 | Morgan | G06Q 10/06313 |
| 2022/0238204 A1* | 7/2022 | Schaeppi | G06Q 50/01 |
| 2022/0254461 A1* | 8/2022 | Vaughan | G06N 5/01 |
| 2023/0245031 A1* | 8/2023 | Lucas | G06Q 10/06393 |
| | | | 705/7.39 |

OTHER PUBLICATIONS

Leilani Battle et al., "Database Benchmarking for Supporting Real-Time Interactive Querying of Large Data", Proceedings of the 2020 Acm Sigmod International Conference on Management of Data, Jun. 2020, pp. 1571-1587, ACM, https://www.cs.umd.edu/~leilani/static/papers/battle2020database.pdf.

* cited by examiner

SYSTEM AND METHOD FOR MEASURING USER EXPERIENCE OF INFORMATION VISUALIZATIONS

CROSS-REFERENCE TO RELATED APPLICATIONS AND PRIORITY

This U.S. patent application claims priority under 35 U.S.C. § 119 to India Application No. 202121005325, filed on Feb. 8, 2021. The entire content of the abovementioned application is incorporated herein by reference.

TECHNICAL FIELD

The disclosure herein generally relates to the field of user experience (UX) analysis, and specifically, to a system and method for measuring the user experience of information visualizations.

BACKGROUND

The success of any information visualization depends on multiple aspects. As these aspects are diverse and subjective, it is almost impossible to measure or benchmark and compare them with other visualizations. Because of this, it is currently not possible to measure and benchmark information visualizations in a holistic, diagnostic, and objective manner. There are various aspects to influence the UX quality of the information visualization as accurate visual encoding of data. For example, time taken to understand and derive insights from an information visualization depends on multiple factors like the complexity of data, level of granularity, interactive features, domain knowledge of the user etc. Hence, time taken for two different charts is not comparable, even though they are of the same units. Similarly, aspects like overall experience cannot be quantified due to their subjective nature.

In the existing state of the art, there are various challenges such as complexity of data, level of granularity, interactive features, domain knowledge of the user etc. There can also be cases where an information visualization is very delightful and appealing to look at but lacks usability in data consumption. In such cases, the visualization might receive good user feedback even though it is not very effective in conveying clear insights. The opposite can also hold true where an efficient visualization might appear unwelcoming due to bad visual appeal, leading to a low adoption rate. Hence, it is essential to consider all influencing factors while measuring the UX quality of visualizations. It is also important to harness data from all these factors to not only calculate a unified score, but also identify areas of usability improvement.

However, there are challenges as the individual areas are vague, qualitative, and non-comparable. In spite of the differences, these aspects are all equally essential as together, they predict the overall success of an information visualization. While some amount of data can be derived from traditional activities like user testing, there is currently, no way of taking into consideration business, task, and emotional factors to compute a singular score for measuring the user experience.

SUMMARY

Embodiments of the disclosure present technological improvements as solutions to one or more of the abovementioned technical problems recognized by the inventors in conventional systems. For example, in one embodiment, a system and method for measuring the user experience of at least one information visualization of an application is provided.

In one aspect, the processor-implemented method comprising receiving, via an input/output interface, the plurality of parameters of information visualization of at least one application, usage data, and one or more feedbacks on each of the plurality of parameters of information visualization from a plurality of users. Herein, the plurality of parameters of information visualization includes quantitative and qualitative parameters of information visualization. Further, analyzing the usage data, and the one or more feedbacks on each of the plurality of parameters of information visualization from a plurality of users based on a natural language processing (NLP) to allocate a quantitative value against each of the received qualitative parameters of information visualization using a predefined range of scores. Complexity of visualization is determined based on a predefined set of complexity definitions for a plurality of parameters of information visualization. Further, the method benchmarks each of the plurality of parameters of information visualization based on the determined complexity of visualization and a predefined threshold to get a benchmarked value.

Furthermore, the method comprising calculating a pragmatic score, and a hedonic score for each of the plurality of parameters of information visualization based on the allocated quantitative value against each of the received qualitative parameters and the benchmarked value of each of the plurality of parameters of information visualization. Further a scatter chart is plotted based on the calculated pragmatic score and hedonic score. The scatter chart is divided into a plurality of sections to identify one or more scenarios. Herein, the one or more scenarios include low hedonic score and high pragmatic score, high hedonic score and low pragmatic score, low hedonic score and low pragmatic score, and high hedonic score and high pragmatic score. Further, measuring the user experience to profile the at least one information visualization of the application based on the identified one or more scenarios.

In another aspect, a system for measuring the user experience of at least one information visualization of an application is provided. The system includes an input/output interface configured to receive the plurality of parameters of information visualization of at least one application, usage data, and one or more feedbacks on each of the plurality of parameters of information visualization from a plurality of users, at least one memory storing a plurality of instructions and one or more hardware processors communicatively coupled with the at least one memory, wherein the one or more hardware processors are configured to execute the plurality of instructions stored in the at least one memory.

Further, the system is configured to analyze the usage data, and the one or more feedbacks on each of the plurality of parameters of information visualization from a plurality of users based on a natural language processing (NLP) to allocate a quantitative value against each of the received qualitative parameters of information visualization using a predefined range of scores. Further, the system is configured to determine complexity of visualization based on a predefined set of complexity definitions for the plurality of parameters of information visualization. Furthermore, the system benchmarks each of the plurality of parameters of information visualization based on the determined complexity of visualization and a predefined threshold to get a benchmarked value. The system then calculates a pragmatic score, and a hedonic score for each of the plurality of parameters of information visualization based on the allocated quantitative value against each of the received qualitative parameters and the benchmarked value of each of the plurality of parameters of information visualization. Furthermore, the system is configured to plot a scatter chart based on the calculated pragmatic score and hedonic score. This chart is then divided into a plurality of sections to identify one or more scenarios, wherein the one or more scenarios include scenarios of low hedonic score and high pragmatic score, high hedonic score and low pragmatic score, low hedonic score and low pragmatic score, and high hedonic score and high pragmatic score. Then the system measures the user experience to profile the at least one information visualization of the application based on the identified one or more scenarios.

In yet another aspect, a non-transitory computer readable medium storing one or more instructions which when executed by one or more processors on a system cause the one or more processors to perform the method is provided. The non-transitory computer readable medium for measuring the user experience of at least one information visualization of an application is provided. The method includes one or more steps such as receiving, via an input/output interface, the plurality of parameters of information visualization of at least one application, usage data, and one or more feedbacks on each of the plurality of parameters of information visualization from a plurality of users. Herein, the plurality of parameters of information visualization includes quantitative and qualitative parameters of information visualization. Further, analyzing the usage data, and the one or more feedbacks on each of the plurality of parameters of information visualization from a plurality of users based on a natural language processing (NLP) to allocate a quantitative value against each of the received qualitative parameters of information visualization using a predefined range of scores. Complexity of visualization is determined based on a predefined set of complexity definitions for a plurality of parameters of information visualization. Further, the method benchmarks each of the plurality of parameters of information visualization based on the determined complexity of visualization and a predefined threshold to get a benchmarked value.

Furthermore, the method comprising calculating a pragmatic score, and a hedonic score for each of the plurality of parameters of information visualization based on the allocated quantitative value against each of the received qualitative parameters and the benchmarked value of each of the plurality of parameters of information visualization. Further a scatter chart is plotted based on the calculated pragmatic score and hedonic score. The scatter chart is divided into a plurality of sections to identify one or more scenarios. Herein, the one or more scenarios include low hedonic score and high pragmatic score, high hedonic score and low pragmatic score, low hedonic score and low pragmatic score, and high hedonic score and high pragmatic score. Further, measuring the user experience to profile the at least one information visualization of the application based on the identified one or more scenarios.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes, which may be substantially represented in computer readable medium and so executed by a computer or processor, whether or not such computer or processor is explicitly shown.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments.

Referring now to the drawings, and more particularly to FIG. 1 through 6, where similar reference characters denote corresponding features consistently throughout the figures, there are shown preferred embodiments and these embodiments are described in the context of the following exemplary system and/or method.

Figure 1:
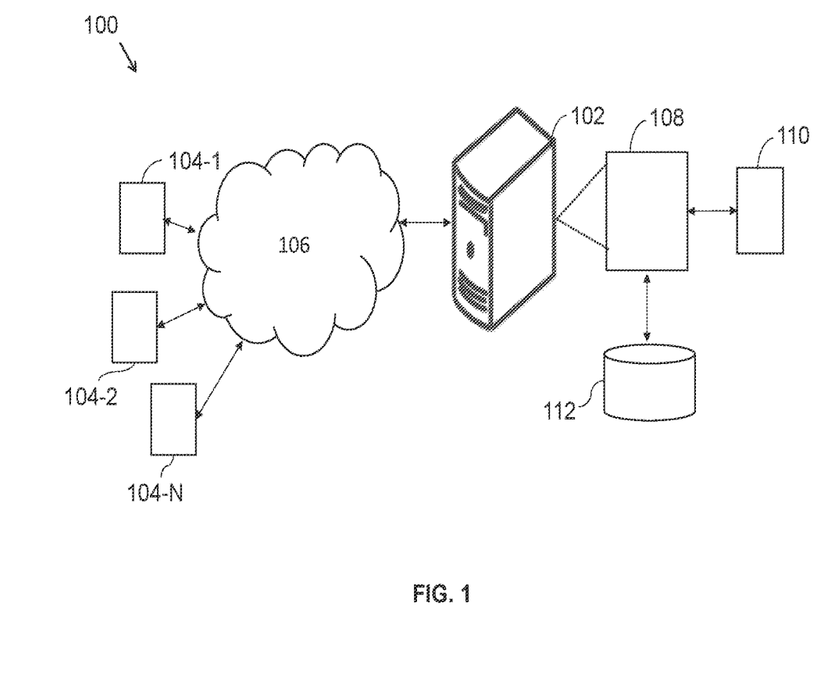
FIG. 1 illustrates an exemplary system for measuring the user experience of at least one information visualization of an application, according to an embodiment of the present disclosure.

FIG. 1 illustrates a block diagram of a system (100) for measuring the user experience of at least one information visualization of an application, in accordance with an example embodiment. Although the present disclosure is explained considering that the system (100) is implemented on a server, it may be understood that the system (100) may comprises one or more computing devices, such as a laptop computer, a desktop computer, a notebook, a workstation, a cloud-based computing environment and the like. It will be understood that the system (100) may be accessed through one or more input/output interfaces 104-1, 104-2 . . . 104-N, collectively referred to as I/O interface (104). Examples of the I/O interface (104) may include, but are not limited to, a user interface, a portable computer, a personal digital assistant, a handheld device, a smartphone, a tablet computer, a workstation, and the like. The I/O interface (104) are communicatively coupled to the system (100) through a network (106).

In an embodiment, the network (106) may be a wireless or a wired network, or a combination thereof. In an example, the network (106) can be implemented as a computer network, as one of the different types of networks, such as virtual private network (VPN), intranet, local area network (LAN), wide area network (WAN), the internet, and such. The network (106) may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network (106) may include a variety of network devices, including routers, bridges, servers, computing devices, storage devices. The network devices within the network (106) may interact with the system (100) through communication links.

The system (100) supports various connectivity options such as BLUETOOTH®, USB, ZigBee and other cellular services. The network environment enables connection of various components of the system (100) using any communication link including Internet, WAN, MAN, and so on. In an exemplary embodiment, the system (100) is implemented to operate as a stand-alone device. In another embodiment, the system (100) may be implemented to work as a loosely coupled device to a smart computing environment. The components and functionalities of the system (100) are described further in detail.

In the preferred embodiment, the system (100) is configured for measuring the user experience of at least one information visualization of an application. The system is configured to collect the plurality of parameters of the information visualization in an organized and structure manner. Further, the system processes the collected data such that the plurality of parameters is measurable, meaningful, and most importantly comparable. This allows for further abstraction and analysis to derive even more holistic insights, quality, measures, and benchmarking. The system is also configured for analysis at multiple levels i.e. at the chart level, as well as the overall application level.

The system (100) comprises at one or more databases (112) and one or more hardware processors (108) which are communicatively coupled with the at least one memory to execute a plurality of modules (110) therein. Further, the input/output interface (104) is configured to receive the plurality of parameters of information visualization of at least one application, usage data, and one or more feedbacks on each of the plurality of parameters of information visualization from a plurality of users. Herein, the plurality of parameters of information visualization includes a first group of quantitative parameters of information visualization and a second group of qualitative parameters of information visualization.

It would be appreciated that multiple questions or tasks are defined for each chart in the application. The user is asked to iteratively answer each question for a certain chart and then move to the next chart. The system is configured to record task specific data such as time taken to complete the task, number of steps followed, accuracy of the answer etc. The user is provided with a feedback form for responses to the plurality of parameters of the information visualization. Herein, the plurality of parameters includes clarity of data, effortlessness, and overall experience.

Figure 2:
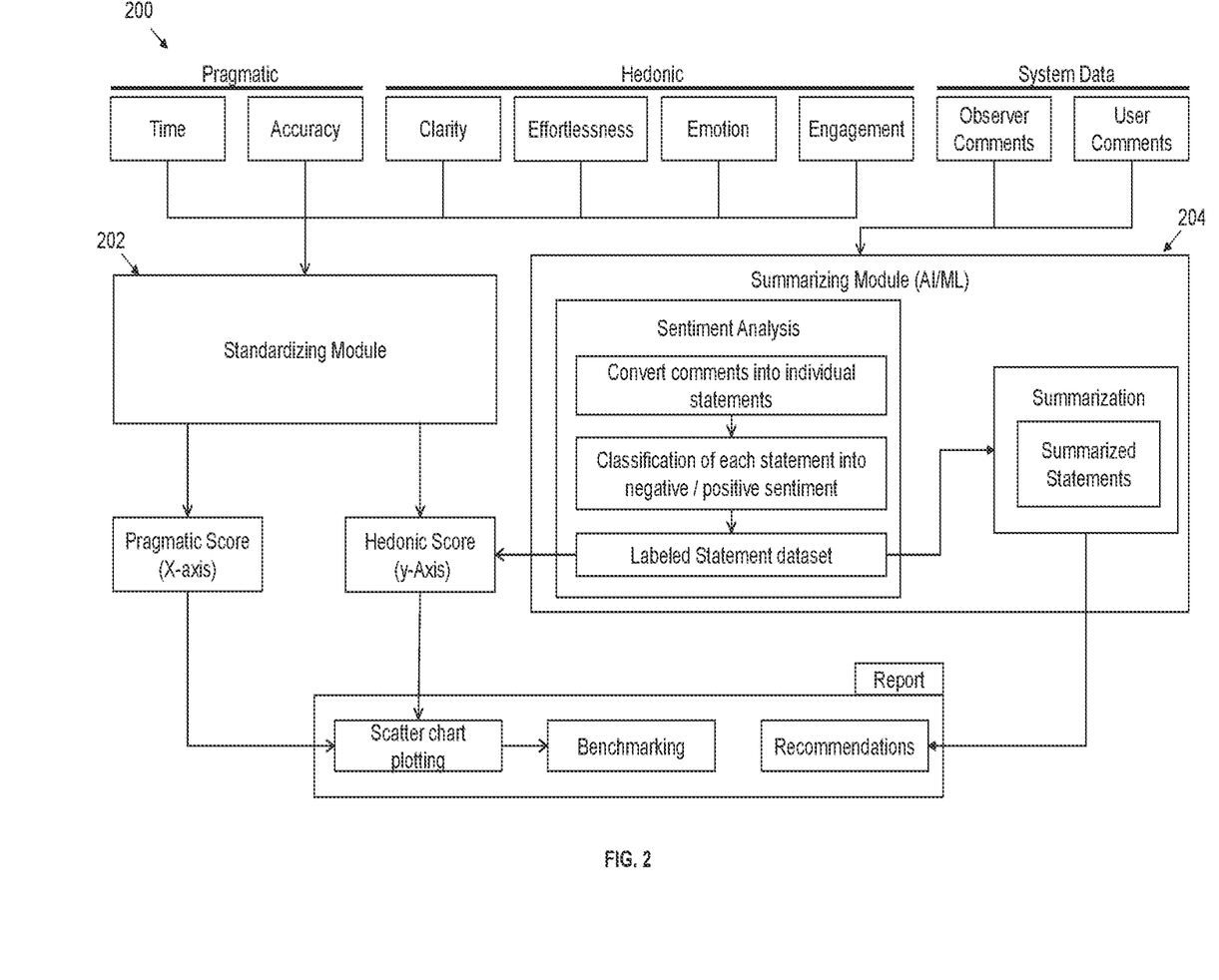
FIG. 2 is a functional block diagram to illustrate one or more modules of the system, according to an embodiment of the present disclosure.

FIG. 2 illustrates a functional block diagram (200) of the system (100) that receives a plurality of parameters relating to the user experience and effectiveness of a visualization. This includes but is not limited to usage data like time and successful task completion, data about user's overall experience and emotional response and observation data. Furthermore, this data includes both quantitative as well as qualitative parameters. They are also grouped into pragmatic, hedonic and system categories. Quantitative data is entered into a standardizing module (202). The standardizing module (202) is configured to standardize data across a variety of units of measure and contexts into a uniform and comparable unit of measure. Similarly, a summarizing module (204) of the system (100) is configured to process qualitative and textual data like user and observer comments. The summarizing module (204) module conducts sentiment analysis on individual statements in the comments to create a labeled statement dataset. This dataset comprises of statements marked with pre-defined sentiments. This dataset is leveraged to summarize the statements into key recommendations and observations of each sentiment. Furthermore, the standardized data from the standardizing module (202) along with the labelled statement dataset is further leveraged to compute a hedonic and pragmatic value. The computed hedonic and pragmatic values are then used to plot the application on a scatter chart. Herein, the hedonic value is used for the y-axis plotting while the pragmatic value is used for the x-axis plotting. Based on the location of plotting on this scatter chart, the system (100) then benchmarks the visualization. Furthermore, recommendations based on summaries generated from the labeled statement dataset is created. The system (100) creates a report that includes this recommendations along with the scatter chart for further consumption.

Figure 3:
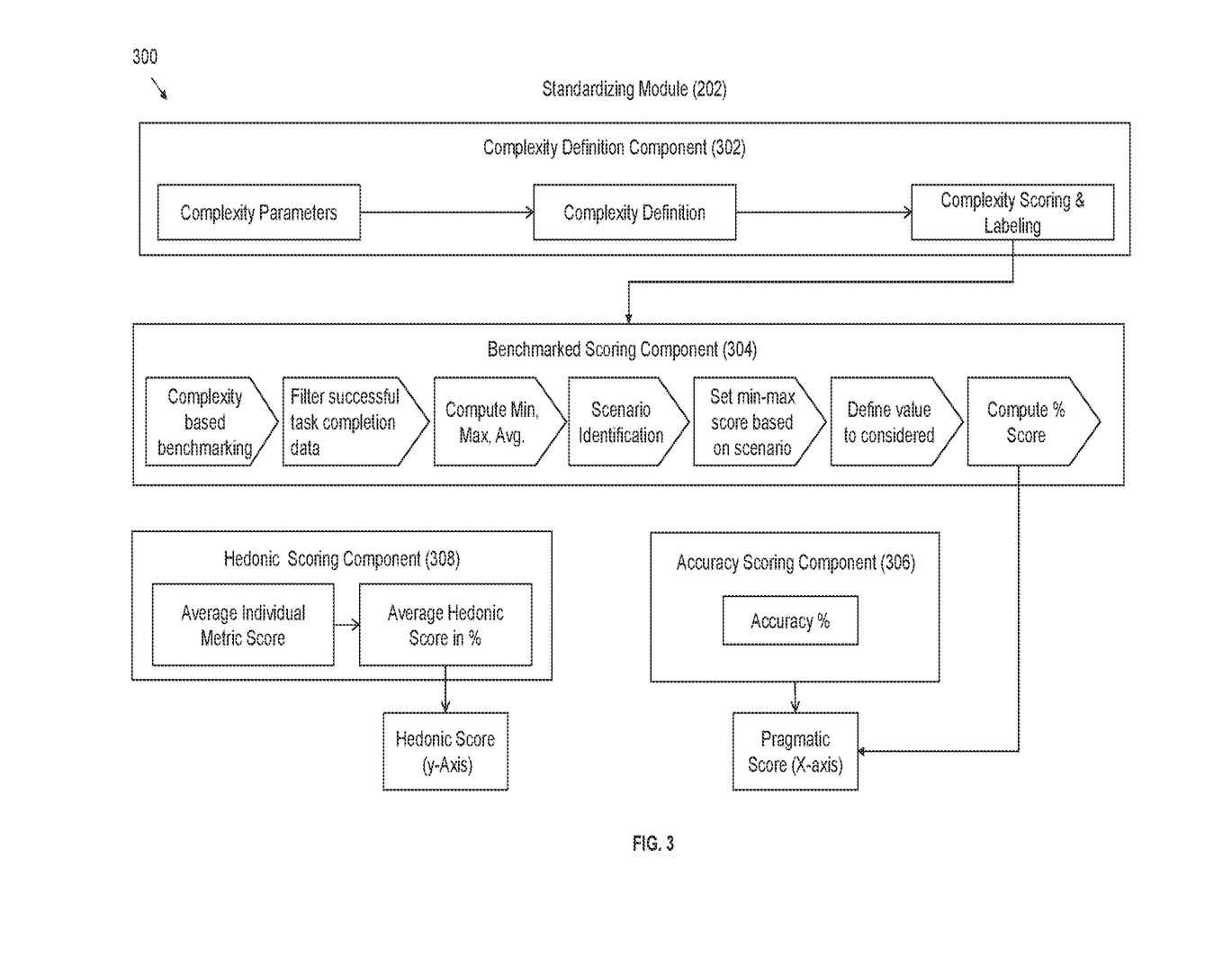
FIG. 3 is a functional block diagram to illustrate a standardizing module of the system, according to an embodiment of the present disclosure.

Referring FIG. 3, a functional block diagram (300) to illustrate a standardizing module (202) of the system (100) according to an embodiment of the present disclosure. The standardizing module (202) comprises of a complexity definition component (302), benchmarked scoring component (304), accuracy scoring component (306) and hedonic scoring component (308). The end output of the standardizing module (202) is a hedonic score and a pragmatic score. The goal of the complexity definition component is to objectively measure the complexity of a visualization. This is done by leveraging a plurality of complexity parameters and complexity definitions for each complexity level. The complexity definition component (302) scores and labels the visualization against these parameters and definitions to determine the complexity of the visualization. After the complexity of the visualization is determined by the complexity definition component (302), the benchmarked scoring component (306) benchmarks a plurality of usage parameters against a benchmark of the determined complexity. The benchmarked scoring component (306) first determines the benchmark for the determined complexity. Of all the usage data received, only the data for tasks were successfully completed are considered for further processing. The benchmarked scoring component (306) then processes the filtered data to compute a minimum, maximum, and average value. Further, the system (100) identifies a scenario from a predefined set of scenarios based on computed values and benchmark. The system (100) then sets the minimum and maximum possible score along with a range and value for calculation. Based on the set values a benchmarked score is then computed by the system (100). The hedonic scoring component (308) takes into consideration all the hedonic parameters like quantified user feedback. And computes the average hedonic score. Similarly, parameters like task completion are processed by the accuracy scoring component (306) to compute the accuracy score. This accuracy score along with the benchmarked score is further processed to compute the pragmatic score. Similarly, the average hedonic score is leveraged to compute the hedonic score.

Figure 4:
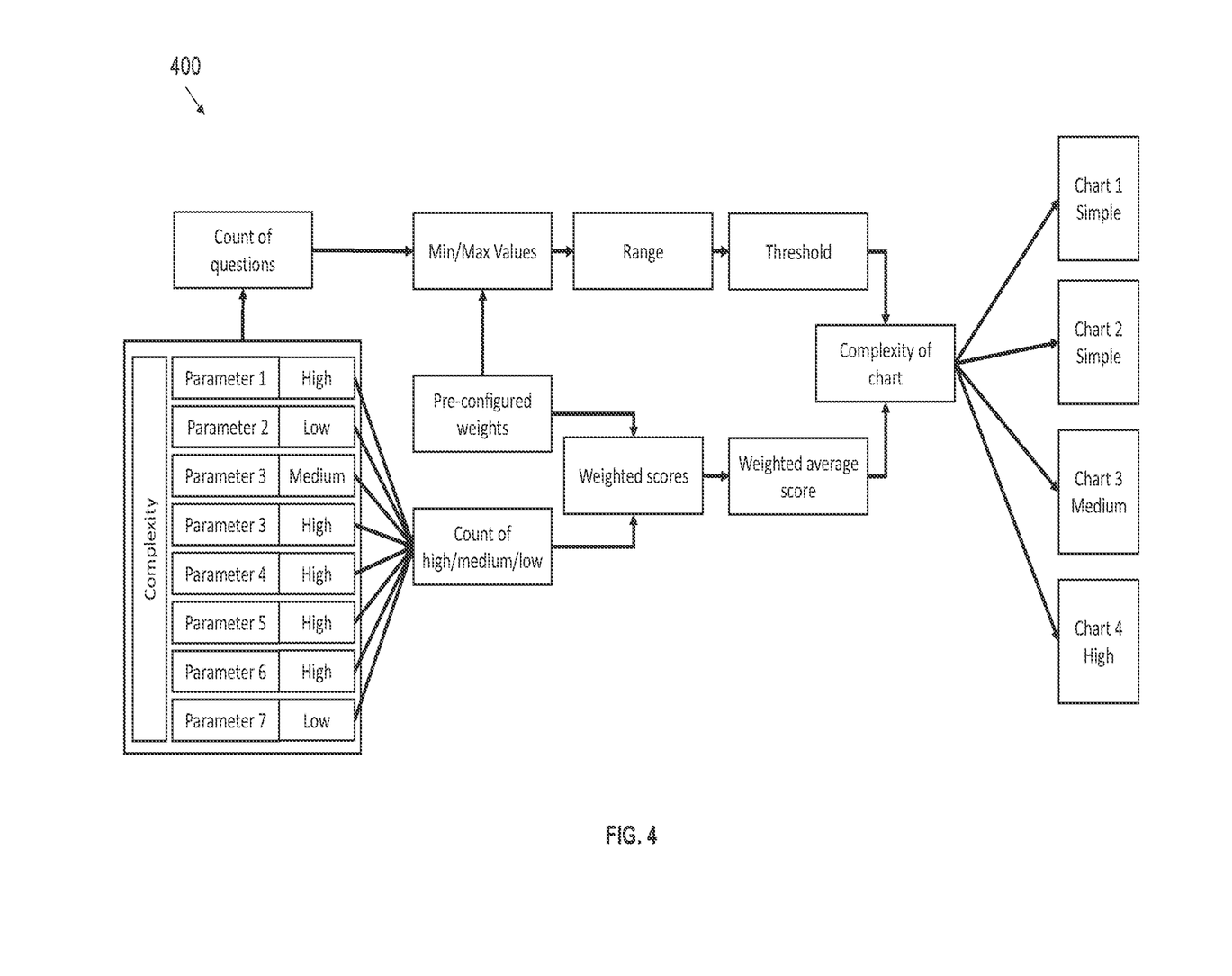
FIG. 4 is a functional block diagram to compute level of complexity in the at least one information visualization, according to an embodiment of the present disclosure.

Referring FIG. 4, a functional block diagram (400) to compute level of complexity in the at least one information visualization is provided. Herein, the system (100) is configured to take into consideration a set of pre-defined complexity parameters (e.g. dimensions of data, types of data, levels of insights, depth of data etc.). For each complexity parameter, set complexity definition (e.g. for dimensions of data: <2 dimensions=low, 2-4 dimensions=medium, >4=high) and set weightage scores for each complexity level (e.g. low=2, medium=4, high=6). Further, the system (100) is configured to map each of the pre-defined complexity parameters with each of the plurality parameters of the information visualization and indicate the matching complexity definition. Furthermore, the system (100) is configured to count matching complexity definitions for each of the plurality of parameters of the information visualization.

In one example, wherein level of complexity in an information visualization is computed. Herein, if dimensions of data are low, types of data are high, depth of data is low then, count of low is 2, medium is 0 and high is 1 of the information visualization. The count of complexity definitions is multiplied with the predefined weightage to compute weighted scores. The computed weighted score for each chart using scores to compute range by simulating lowest and highest possible scores and simulating max count for low and high definitions. Further, the system computes interval by dividing the computed range by the number of complexity levels and computes threshold for lowest complexity level using lowest score and adding interval value. Furthermore, the system computes threshold for second level by adding the threshold of lowest complexity level and the interval. It would be appreciated that the system repeatedly computes threshold for second level for all complexity levels by adding the interval to the previous level's threshold. For each visualization, compare the weighted average score with the computed thresholds to determine the complexity of the at least one information visualization.

Therefore, for each complexity level, the system (100) is configured to determine a benchmark for each determined complexity dependent parameter. Herein the sources of the benchmarks include, but are not limited to, the older versions of the application being tested, competitor application, SME insights and recommendations, and business SLAs. For each complexity dependent parameter, filter successful actions and compute the average value. For each complexity dependent parameter based on benchmark, computed average and the lowest and highest measure determine one or more scenarios. For example:

Scenario 1-lowest, highest, and average scores breach the benchmark;

Scenario 2-highest complies with the benchmark, however, lowest, and average breach the benchmark;

Scenario 3-highest and average complies with the benchmark, lowest breached the benchmark; and Scenario 4-lowest, highest, and average complies with the benchmark.

For each of the one or more scenarios, a minimum-maximum percent score limit is set. Based on the minimum-maximum percent score limit and computed average value, the system computes percentage score of each complexity dependent parameter for each visualization.

In another embodiment, wherein the system (100) is configured to benchmark each of the plurality of parameters of information visualization based on the determined complexity and a predefined threshold to get a benchmarked value against each of the plurality of parameters of information visualization.

Herein, the system is configured to analyze an information visualization against a plurality of complex definitions. Furthermore, the system computes a weighted score based on pre-configured weights for each complexity level and a count matching definition parameters. Similarly, the system calculates threshold values for each complexity level based on the lowest and highest possible scores and number of complexity levels. The system then compares the weighted score with the thresholds to arrive at the complexity of the information visualization.

Figure 5:
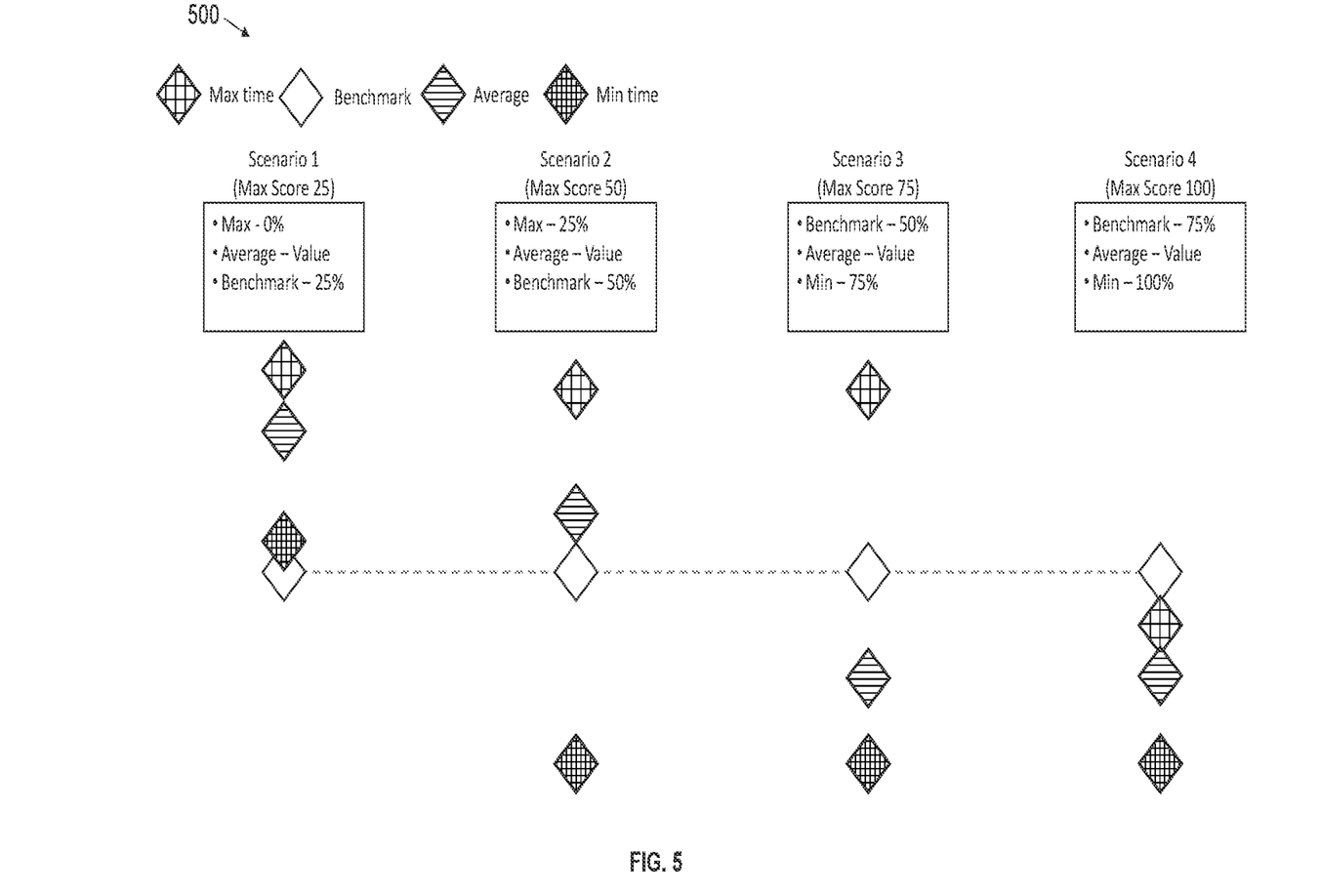
FIG. 5 is a schematic diagram to illustrate visualization complexity determination, according to an embodiment of the present disclosure.

Referring FIG. 5, a schematic diagram (500) to illustrate visualization complexity determination according to an embodiment of the present disclosure. Herein, time taken to complete a task is collected from a plurality of users for a task performed on an information visualization. Time taken for unsuccessful completion of the tasks are excluded and filtered out resulting in only successful completed values being considered for further processing. Minimum time taken (fastest), maximum time taken (slowest) and average time taken are then extracted. A predefined benchmark is then compared to the maximum, minimum and average values to determine the applicable scenario. Herein, the FIG. 4 demonstrates four possible scenarios where maximum, minimum and average all comply, do not comply, or partially comply with the benchmark. Depending on the scenario, a limit for time score is set. Values to be considered for the range is also defined based on the determined scenario. An accurate score is then computed considering the range and average time values.

In another embodiment, wherein the system (100) is configured to plot a scatter chart based on the calculated pragmatic score and hedonic score. It is to be noted that the scatter chart is divided into a plurality of sections to identify one or more scenarios. The one or more scenarios include scenarios of low hedonic score and high pragmatic score, high hedonic score and low pragmatic score, low hedonic score and low pragmatic score, and high hedonic score and high pragmatic score.

In yet another embodiment, wherein the system (100) is configured to measure the at least one information visualization of an application based on the identified one or more scenarios.

In one example, wherein an implementation includes a user testing portal that collects data about various parameters involving the data visualization. Herein, the various parameters include time taken to complete various tasks, successful/unsuccessful completion of tasks, user feedback, custom comments etc. Furthermore, tasks are configured as questions related to the business requirement, user requirement, underlying data within the information visualization and type of visualization. Answers to these questions would determine the successful completion of the task. For example, a weather monitoring application has a dashboard section comprising of four visualizations (Rainfall readings for past 12 months shown as a line chart, Map of a geographic region with temperature, humidity and rainfall marks for various areas within this region on the map, A simple bar chart displaying the rainfall received in the previous day in various areas within the region, a scatter chart showing temperature and rainfall of various areas plotted on the chart.

Herein, each chart would comprise of some underlying data, for example, the first chart would contain rainfall readings of all the areas summarized according to months calculated for the past 12 months. Similarly, the chart would also have some business and user goals like understanding the overall trend of rainfall (is it increasing or decreasing over time), compare the rainfall between different months, interact with the chart to compare rainfall at a more granular level (compare weeks in the year rather than months) etc. All these goals can be rephrased as questions to the users. For example, "what is the overall trend of rainfall for this period?", "In which month did it rain the most in a certain area?", "Does temperature of a region affect the rainfall it receives?" etc. When users answer these questions, the system collects the usage, accuracy and performance data as mentioned above. Similarly, the user's perception and experience are captured using various feedback mechanisms like rating systems, comments, and feedback.

The above-mentioned steps can be done for a plurality of data visualizations in one or more applications. The user testing portal collects all this data by displaying the visualizations to the user along with the questions. The system measures the time between displaying the chart with questions and receiving of an answer from the user. Questions are configured as multiple-choice questions with four options. The right answer is pre-configured in the system. This helps the system not only measure time, but also detect success or failure of the task.

Furthermore, after the tasks are completed, the portal also displayed a feedback form to the user. This includes questions about various aspects about the experience of using the application. Example of such aspects include clarity of the data, effortlessness, engagement, and overall emotion felt while using the application. The portal also provides a textbox for any comments, observations, or specific feedback the user might want to provide. This is done for a plurality of users. Once data is collected from all users, for all information visualizations and applications, the system can proceed with data analysis. The system collects qualitative as well as quantitative data. Furthermore, some of the data is also contextual in nature and hence not comparable. It is essential for all data to be comparable and computable with each other to derive any useful insight from it. Hence, one of the goals of this process is to convert all values to a common unit that can aid in both, quantitative measurement of the parameters as well as further summarization and processing of multiple parameters.

In another embodiment, a percentage score is leveraged as a common unit. Qualitative data like overall user experience, perception and feedback is quantified using multi-point scaled feedback and sentiment analysis via NLP. For example, detection and measurement of confusion (if any) can be achieved by leveraging a feedback mechanism specifically for clarity of data. Here a user is asked to rate the clarity of data using a rating mechanism. Similarly, general inputs from users can be collected using text boxes as comments. This data can then be processed using sentiment analysis to gauge the overall response of the user. Such analysis when done for multiple users, can provide quantified data about the UX performance of the visualization by leveraging, for example, the count of comments with positive sentiments as compared to those with negative sentiments. In this example, the clarity of data, effortlessness of the interactions, overall user's experience and engagement levels are collected by leveraging a rating system. Here, users are asked to rate the above-mentioned aspects based on their experience.

In order to avoid bias, positive and negative options are provided instead of a min-max score on the scale. For example, users are asked to rate the clarity of content between confusing/overwhelming and clear/concise. Similarly, effortlessness is rated between Exhausting and Effortless, Engagement between Boring and Engaging and the overall sentiment between (frustrating/irritating) and Delightful. Users are provided with a slider between the above-mentioned values. They can move that slider towards either side depending on their experience. While the UI (user interface) does not display a min-max value, the system considers a min and max value mapped to the above-mentioned options. The more negative the outcome (confusing, exhausting etc.) the closer the value would be to the min value. Similarly, the more positive the outcome (clear/concise, effortless etc.) the closer the value would be to the max value. In this example, the negative options represent a minimum value of 0 while the positive options represent a value of 10. In such a case, if the user moves the slider to the exact center, the value to be considered would be 5, which is the mid-point in this case. Now if the user moves the slider towards the negative option, the score will start to drop below 5 until it reaches 0 where the user has moves the slider towards the end of the negative option side.

Additionally, a text box is also provided for users to mention any feedback, observation, or comments. NLP is leveraged here, to detect certain common patterns to extract further insights related to common pain areas or delights that many users mentioned. Additionally, sentiment analysis is also conducted to determine the overall sentiment of the user. A count of positive vs negative statements provides a quantitative measure of this data. As stated earlier, in this example a percentage score is leveraged as a common unit for all data. Hence, the system converts the average rating score (which in on a scale of 0-10) into a percentage score. Similarly, a count of positive statements as compared to the total number of statements help arrive at a percentage score for this dataset. Quantitative data, too, even though measurable, is not always comparable. As an example, successful completion of tasks can be measured as accuracy; however, it cannot be compared with time which is measured as a different unit.

Similarly, time itself will not suffice as a measure of the user experience of an information visualization. This is because the same time measure can be good for a complex chart but bad for a simple chart. As an example, if a user is able to complete a task and derive the required insight from a very complex visualization in 3 minutes, it might indicate a high effectivity for the chart. However, if the users take 3 minutes to complete a task and derive insights on a simple chart, it may indicate a low effectivity for the chart. Here, the same measure (3 minutes) can mean contrasting things depending on the complexity of the chart. Hence, the complexity of the visualization should also be quantified, categorized, and benchmarked so that the context is also taken into consideration. This is done by creating various complexity levels, for example high, medium, and low complexity and then configuring definitions for each level. The definition includes various parameters like Dimensions of data, Dimensions of insights, Types of data, Depth of data/Insights etc. Each parameter would have a value set for each complexity level. For example, for dimensions of data, 2 or less dimensions would contribute to a low complexity, 3 to 4 dimensions would contribute to a medium complexity and 4 and above dimensions would contribute to a high complexity.

Similarly, other parameters would also have their values set. The chart is then checked against these parameters to get a matching could with the values. For example, a simple bar chart showing rain received in various areas on a day would have just two dimensions (rain received and area name), thus, for this parameter it would be categorized as low complexity. Similarly, the same check if performed for all parameters and charts. The same chart can match a low definition for one parameter and a high for another parameter such as the dimensions of data might be high, however, the types of data could be of only two kinds such as a map showing temperature, humidity and rainfall for various areas in a region would have many dimensions (rain, humidity, temperature and location) however it would also constitute only two kinds of data (geographic for location and numerical for temperature, rainfall and humidity). Hence it would be categorized as high complexity for the number of dimensions parameter but low for the types of data parameter.

Once this activity is done for all charts and definitions, a count of matching high, medium, and low values is taken. This count is then multiplied with pre-configured weights assigned to each level. These weighted values are then averaged to arrive at a weighted average score. Simultaneously, the highest and lowest possible scores are computed by simulating maximum low and high matches. This gives the range within which a weighted score could occur. This range is then divided by the number of complexity levels to find an interval threshold.

In another example, for a given chart, if all parameters matched to the low definition, the weighted score would be 1 and if all parameters matched to the high definition the score would be 13. Then, the range would be 12. If we take this value and divide it with the number of levels which is 3(high, medium, and low) we get an interval threshold of 4. Using this value, we can compute the thresholds for each complexity level. In this example anything below the score of 5 (4+lowest score) would be a simple chart, between 5 and 9(4+medium lowest score) would be medium and above 9 till 13 would be categorized as a high complexity chart). Based on these thresholds and the actual weighted average score of a chart, the system determines the complexity of the chart.

In yet another embodiment, the system is configured to calculate the benchmarked score for each parameter and chart. Here, depending on the complexity of a chart, a benchmark is configured. This benchmark can be configured based on business SLAs, SME (subject matter expert) insights, competitor measures, previous versions of the application or any other source as required. As an example, if there is a similar weather monitoring application already in the market, usage values from this application can be used as benchmarks. Here, the visualizations in this application are also categorized based on the complexity using the method described above. Average time taken for simple complexity visualizations can then be computed to arrive at a benchmark score for simple visualizations. Once benchmarks for each complexity level is defined, the actual usage data is then processed.

In another example of time, 10 users were part of the data collection process for the application. Here 8 users were able to complete the task successfully, and two failed. Hence, the time taken by these two users is discarded and other 8 are considered for further processing. In this data set, 2 users took 2 minutes each to complete the task. Similarly, 1 user took 4 minutes, 2 users took 6 minutes and 3 users took about 8 minutes to complete the same task on the same visualization successfully. It is also determined that the average time taken on the competitor application for a task on a visualization with the same complexity is 3 minutes. Hence 3 minutes is considered as the benchmark time for this scenario. The fastest user's time (2 minutes), the slowest user's time (8 minutes) and the average time taken (5.5 minutes) is also considered. These four values can result in four likely scenarios. These include, all users breaching the benchmark (all users took more than 3 minutes), the slowest and average time breaches the benchmark, however, the fastest complies with the benchmark (most users took more than 3 minutes, however some users were able to complete within 3 minutes), the fastest time and average time comply with the benchmark, however slowest breaches it (most users are able to complete within 3 minutes, however, some users take longer than 3 minutes) and all users comply with the benchmark (all users are able to complete with 3 minutes). The first scenario is least favorable, followed by the second, third and then the fourth, which is the most favorable.

Furthermore, a maximum and minimum score limit is set for each scenario. For example, for the first (least favorable) scenario, the maximum score is capped to 25% and the minimum to 0%. Similarly, for scenario 2, it is set to 25%-50%, likewise scenario 3 is set to be from 50%-75% and eventually scenario 4 which is 75%-100%. The benchmarked score is then calculated basis the average time taken, the benchmark value and the minimum or maximum time taken depending on the scenario. In this example, the minimum time is 2 minutes, maximum is 8 minutes, average time is 5.5 minutes and the benchmark time is 3 minutes. Hence, this is considered as scenario 2 and falls within the range of 25% to 50%.

In yet another aspect, in order to calculate the benchmarked score, the benchmark time is subtracted from maximum time taken (8 minutes minus 3 minutes) to compute the range (5) between these two values. Similarly, the difference between the maximum time taken (8 minutes) and average time taken (5.5 minutes) is also computed (2.5). This value (2.5) is then used to calculate a percentage of the range. In this example, 2.5 is 50% of 5. This percentage is then used to compute the relative value between the range of 25-50. In this example, it would be 12.5 which is 50% of 25 (25-50). The closer the average time taken is to the benchmark, the higher the score would be. The maximum possible being 50. Similarly, the closer the average time taken is to the slowest user, the lowest the score would be, the minimum being 25. In this case, the benchmarked score is 37.5% (25+50 which is 12.5). Similarly, if there is a scenario involving a margin of errors depending on the complexity, the same can be mapped to different complexity levels and a percentage score can be calculated using the above approach.

It would be noted that no such scenario as there can be no errors irrespective of complexity. In such scenarios, a percentage score of the right vs total answers provided should suffice. Once a standardized score of all parameters are calculated, a higher-level summarized value can be computed. For this, all hedonic parameters (relating to the emotion) is averaged to get the hedonic score. Similarly, all pragmatic parameters (relating to the effectiveness and task completion) is averaged to get the pragmatic score. These two scores are then used to plot the application or even individual visualizations on a scatter chart. Here, the pragmatic score is plotted on the x-axis and the hedonic scores is plotted on the y-axis.

Herein, the hedonic score works out to be 70% which is the average of the individual scores which include clarity, effortlessness, engagement, overall emotion, and sentiment analyzed comments. Similarly, the pragmatic score works out to be 80% which is the average of the benchmarked time score calculated earlier and the accuracy score computed from the right vs total answers. Hence, the application will be plotted towards the upper right side of the chart. This chart is then divided into sections that represent a low hedonic and pragmatic score, a low hedonic but high pragmatic score, a high hedonic and low pragmatic score and a high pragmatic and hedonic score. This is accomplished by dividing the chart into four equal parts using 50% of both the x and y axis. These sections are then labelled as different profiles. It is to be noted that herein a low hedonic and pragmatic score is labeled as "kludge" which represents a scenario where the application is designed and built in an un-optimized manner. The application in such cases is neither delightful nor effective to use. Similarly, a low hedonic but high pragmatic score is labeled as "pragmatic" which represents a scenario where the application is designed keeping the user's end goals in mind, however, very little attention is given to the aesthetic and attractive aspects of the application. In such cases, the application is effective in task completion, however, users would find it standard, boring, and not as engaging. Applications in this section serve the basic purpose and goal, but do not stand out from competition. Likewise, a high hedonic and low pragmatic score is labeled as "Fad". It would be appreciated that the application is designed with aesthetics and animation aspects in mind, however, lesser attention is given to the key goals and purpose of the application. Users in this case find the application fun and engaging to use, however, their basic requirement and goals are not met here.

Lastly, a high pragmatic and hedonic score is labeled as "Ideal state". Here, the applications are well designed keeping both, users primary goals and objectives as well as aesthetics, animation, and other engaging features. Here, users find the application to be useful, delightful, and engaging to use. The application would be categorized as "Ideal state" as both, pragmatic as well as hedonic scores are above 50%. In the same manner, individual charts, multiple competitor applications or past and present versions of a single application can be plotted for benchmarking and comparison. Further, the hedonic and pragmatic scores and also be combined to arrive at a single score to measure the user experience of information visualizations.

Figure 6:
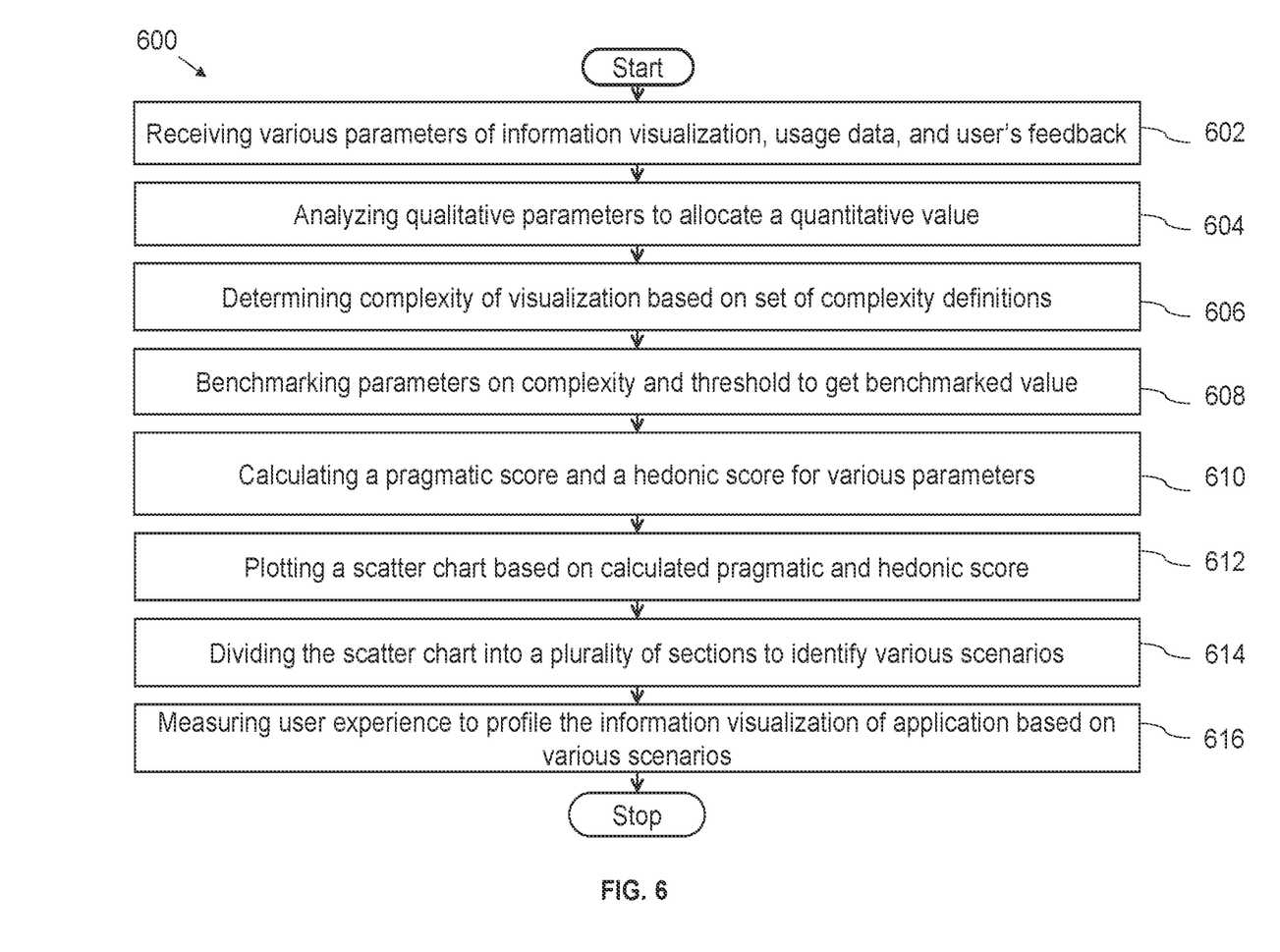
FIG. 6 is a flow diagram to illustrate a method for measuring the user experience of at least one information visualization of an application, in accordance with an embodiment of the present disclosure.

Referring FIG. 6, to illustrate a processor-implemented method (600) for measuring the user experience of at least one information visualization of an application is provided.

Initially, at the step (602), receiving, via an input/output interface, the plurality of parameters of information visualization of at least one application, usage data, and one or more feedbacks on each of the plurality of parameters of information visualization from a plurality of users, wherein the plurality of parameters of information visualization includes a first group of quantitative parameters of information visualization and a second group of qualitative parameters of information visualization.

In the preferred embodiment, at the next step (604), analyzing each of the received second group of qualitative parameters of information visualization based on a natural language processing and predefined range of scores to allocate a quantitative value against each of the received second group of qualitative parameters of information visualization.

In the preferred embodiment, at the next step (606), determining complexity of visualization based on a predefined set of complexity definitions for a plurality of parameters of information visualization.

In the preferred embodiment, at the next step (608), benchmarking each of the plurality of parameters of information visualization based on the determined complexity and a predefined threshold to get a benchmarked value against each of the plurality of parameters of information visualization.

In the preferred embodiment, at the next step (610), calculating a pragmatic score and a hedonic score for the plurality of parameters of information visualization based on the benchmarked value of the plurality of parameters of information visualization and the quantified second group of plurality of parameters of information visualization.

In the preferred embodiment, at the next step (612) plotting, via the one or more hardware processors, a scatter chart based on the calculated pragmatic score and hedonic score.

In the preferred embodiment, at the next step (614), dividing the scatter chart into a plurality of sections to identify one or more scenarios, wherein the one or more scenarios include low hedonic score and high pragmatic score, high hedonic score and low pragmatic score, low hedonic score and low pragmatic score, and high hedonic score and high pragmatic score.

In the preferred embodiment, at the last step (616), measuring the user experience and profiling the at least one information visualization of an application based on the identified one or more scenarios.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of time taken to understand and derive insights from an information visualization which depends on multiple factors like the complexity of data, level of granularity, interactive features, domain knowledge of the user etc. Time taken for two different charts is not comparable, even though they are of the same units. Similarly, aspects like overall experience cannot be quantified due to their subjective nature. There can also be cases where an information visualization is very delightful and appealing to look at but lacks usability in data consumption. In such cases, the visualization might receive good user feedback even though it is not very effective in conveying clear insights. The proposed system and method solve these problems by first providing a system that assist with collecting all necessary parameters in an organized and structured manner. This is done for each user, performing each task for each chart across the application. Once the data is accurately collected, the system then processes the same such that all parameters are measurable, meaningful, and most importantly comparable. The method also allows for analysis at multiple levels i.e. at the chart level, as well as the overall application level.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g.

any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means, and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

What is claimed is:

1. A processor-implemented method (600) of measuring a user experience of at least one information visualization of an application comprising:
receiving (602), via an input/output interface, a plurality of parameters of information visualization of the application, usage data, and one or more feedbacks on each of the plurality of parameters of information visualization from a plurality of users, wherein the plurality of parameters comprising quantitative parameters and qualitative parameters of information visualization;
analyzing (604), via one or more hardware processors, the usage data, and the one or more feedbacks on each of the plurality of parameters of information visualization from a plurality of users based on a natural language processing (NLP) to allocate a quantitative value against each of the received qualitative parameters of information visualization using a predefined range of scores, wherein analyzing the usage data and the one or more feedbacks based on the NLP comprises performing multi-point scaled feedback and sentiment analysis based on the NLP for quantifying the qualitative parameters based on positive statements and negative statements of the plurality of users;
determining (606), via the one or more hardware processors, complexity of visualization based on a predefined set of complexity definitions for the plurality of parameters of information visualization;
benchmarking (608), via the one or more hardware processors, each of the plurality of parameters of information visualization based on the determined complexity of visualization and a predefined threshold to get a benchmarked value;
calculating (610), via the one or more hardware processors, a pragmatic score, and a hedonic score for each of the plurality of parameters of information visualization based on the allocated quantitative value against each of the received qualitative parameters and the benchmarked value of each of the plurality of parameters of information visualization;
plotting (612), via the one or more hardware processors, a scatter chart based on the calculated pragmatic score and hedonic score;
dividing (614), via the one or more hardware processors, the plotted scatter chart into a plurality of sections to identify one or more scenarios; and
measuring (616), via the one or more hardware processors, the user experience to profile the at least one information visualization of the application based on the identified one or more scenarios.

2. The processor-implemented method (600) of claim 1, wherein the quantitative parameters of information visualization are categorized into pragmatic parameters and hedonic parameters.

3. The processor-implemented method (600) of claim 1, wherein the plurality of parameters of information visualization include time, task fulfillment, one or more business goals, user emotions, and user experience.

4. The processor-implemented method (600) of claim 1, wherein the benchmarked value against each of the plurality of parameter of the information visualization include the threshold score, a minimum score, a maximum score, and an average score of each of the plurality of parameters of information visualization.

5. The processor-implemented method (600) of claim 1, wherein the one or more scenarios include a predefined low hedonic score and a predefined high pragmatic score, a predefined high hedonic score and a predefined low pragmatic score, a predefined low hedonic score and a predefined low pragmatic score, and a predefined high hedonic score and a predefined high pragmatic score.

6. A system (100) for measuring a user experience of at least one information visualization of an application comprising:
  an input/output interface (104) to a plurality of parameters of information visualization of the application, usage data, and one or more feedbacks on each of the plurality of parameters of information visualization from a plurality of users, wherein the plurality of parameters comprising quantitative parameters and qualitative parameters of information visualization;
  a memory in communication with the one or more hardware processors (108), wherein the one or more hardware processors (108) are configured to execute programmed instructions stored in the memory, to:
    analyze the usage data, and the one or more feedbacks on each of the plurality of parameters of information visualization from a plurality of users based on a natural language processing (NLP) to allocate a quantitative value against each of the received qualitative parameters of information visualization using a predefined range of scores, wherein analyzing the usage data and the one or more feedbacks based on the NLP comprises performing multi-point scaled feedback and sentiment analysis based on the NLP for quantifying the qualitative parameters based on positive statements and negative statements of the plurality of users;
    determine complexity of visualization based on a predefined set of complexity definitions for the plurality of parameters of information visualization;
    benchmark each of the plurality of parameters of information visualization based on the determined complexity of visualization and a predefined threshold to get a benchmarked value;
    calculate a pragmatic score, and a hedonic score for each of the plurality of parameters of information visualization based on the allocated quantitative value against each of the received qualitative parameters and the benchmarked value of each of the plurality of parameters of information visualization;
    plot a scatter chart based on the calculated pragmatic score and hedonic score;
    divide the plotted scatter chart into a plurality of sections to identify one or more scenarios; and
    measure the user experience to profile the at least one information visualization of the application based on the identified one or more scenarios.

7. A non-transitory computer readable medium storing one or more instructions which when executed by one or more processors on a system cause the one or more processors to perform the method comprising:
  receiving (602), via an input/output interface, a plurality of parameters of information visualization of the application, usage data, and one or more feedbacks on each of the plurality of parameters of information visualization from a plurality of users, wherein the plurality of parameters comprising quantitative parameters and qualitative parameters of information visualization;
  analyzing (604), via one or more hardware processors, the usage data, and the one or more feedbacks on each of the plurality of parameters of information visualization from a plurality of users based on a natural language processing (NLP) to allocate a quantitative value against each of the received qualitative parameters of information visualization using a predefined range of scores, wherein analyzing the usage data and the one or more feedbacks based on the NLP comprises performing multi-point scaled feedback and sentiment analysis based on the NLP for quantifying the qualitative parameters based on positive statements and negative statements of the plurality of users;
  determining (606), via the one or more hardware processors, complexity of visualization based on a predefined set of complexity definitions for the plurality of parameters of information visualization;
  benchmarking (608), via the one or more hardware processors, each of the plurality of parameters of information visualization based on the determined complexity of visualization and a predefined threshold to get a benchmarked value;
  calculating (610), via the one or more hardware processors, a pragmatic score, and a hedonic score for each of the plurality of parameters of information visualization based on the allocated quantitative value against each of the received qualitative parameters and the benchmarked value of each of the plurality of parameters of information visualization;
  plotting (612), via the one or more hardware processors, a scatter chart based on the calculated pragmatic score and hedonic score;
  dividing (614), via the one or more hardware processors, the plotted scatter chart into a plurality of sections to identify one or more scenarios; and
  measuring (616), via the one or more hardware processors, the user experience to profile the at least one information visualization of the application based on the identified one or more scenarios.

\* \* \* \* \*